United States Patent
Fredlund et al.

(10) Patent No.: US 6,442,342 B1
(45) Date of Patent: Aug. 27, 2002

(54) ONE-TIME-USE CAMERA WITH ELECTRONIC FLASH HAVING FILM IDENTIFYING INDICIA WHICH CANNOT BE REMOVED WITHOUT DESTROYING FLASH

(75) Inventors: John R. Fredlund; Joseph A. Manico; Maureen E. Churan-King; William T. Matthias, all of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 68 days.

(21) Appl. No.: 09/229,216

(22) Filed: Jan. 13, 1999

(51) Int. Cl.$^7$ ............................................. G03B 15/03
(52) U.S. Cl. ................................. 396/6; 396/176; 362/3
(58) Field of Search ........................... 396/6, 176, 200; 362/3, 16, 17, 18

(56) References Cited

U.S. PATENT DOCUMENTS

| | | | |
|---|---|---|---|
| D117,575 S | 11/1939 | Nelson | D16/201 |
| 3,484,597 A | * 12/1969 | Schmidt | 362/16 |
| 3,718,815 A | 2/1973 | McDonough et al. | 362/5 |
| 4,239,369 A | * 12/1980 | English et al. | 362/16 |
| 4,317,625 A | * 3/1982 | Van Allen | 396/200 |
| 4,325,104 A | 4/1982 | Broadt et al. | 362/11 |
| 4,412,276 A | 10/1983 | Blinow | 362/278 |
| 5,634,152 A | 5/1997 | Kato et al. | 396/158 |
| 5,651,601 A | * 7/1997 | Morisawa | 362/16 |

OTHER PUBLICATIONS

Cover for Kodak Fun Saver 35 camera, serial Nos. KP 100904, P/N 3B0464, and ST 50.93, Jun. 1995.*

* cited by examiner

Primary Examiner—David M. Gray
(74) Attorney, Agent, or Firm—Roger A. Fields (57) ABSTRACT

A one-time-use camera comprises a filmstrip and an electronic flash with a concave-shaped flash reflector having a front open end, a flash illumination-producing flash tube inside the flash reflector, and a light-transmitting flash cover-lens over the front open end of the flash reflector. The flash reflector has film identifying indicia visible from outside the camera to identify the filmstrip, which are light-reflecting to the same extent as the flash reflector in order to reflect flash illumination produced by the flash tube in concert with the flash reflector. The flash reflector is adhered to the flash tube to prevent the flash reflector from being separated from the flash tube without breaking the flash tube, whereby removal of the film identifying indicia in effect destroys the electronic flash.

1 Claim, 8 Drawing Sheets

ONE-TIME-USE CAMERA WITH ELECTRONIC FLASH HAVING FILM IDENTIFYING INDICIA WHICH CANNOT BE REMOVED WITHOUT DESTROYING FLASH

CROSS REFERENCE TO RELATED APPLICATION

Reference is made to commonly assigned application Ser. No. 09/229,692, entitled ONE-TIME-USE CAMERA WITH ELECTRONIC FLASH HAVING FILM IDENTIFYING INDICIA and filed Jan. 13, 1999 in the names of William T. Matthias, Maureen E. Churan-King and Randy E. Homing.

FIELD OF THE INVENTION

The invention relates generally to the field of photography, and in particular to one-time-use cameras. More specifically, the invention relates to a one-time-use camera with an electronic flash having film identifying indicia which cannot be removed without destroying the flash.

BACKGROUND OF THE INVENTION

Film and cameras that are all in one, commonly referred to as single-use or one-time-use cameras, have become well known. The one-time-use camera is a simple point-and-shoot type comprising an opaque plastic main body part which supports a conventional film cartridge in a cartridge receiving chamber, an unexposed film roll prewound from the film cartridge onto a film take-up spool in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder having front and rear viewfinder lenses, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed frame of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Prior Art Problem

There is a known problem in the recycling, i.e. reuse, of used camera parts, in that the reused parts may become worn or damaged and therefore should not be reused. Thus, it has been suggested that any worn or damaged parts be purposely fractured to render them visibly different during disassembly of the one-time-use camera to retrieve the exposed film. This allows the worn or damaged parts to be readily identified to be discarded, and prevents them from being erroneously reused.

Also, it has been suggested that the opaque front cover part of a remanufactured one-time-use camera with recycled parts have integrally formed film identifying indicia to visibly identify the particular brand of fresh film inside the camera. This kind of identification promotes brand awareness and, thus, tends to assure that the camera with recycled parts and fresh film is of the highest quality.

The Cross-Referenced Application

The cross-referenced application discloses a one-time-use camera comprising a filmstrip, a concave-shaped flash reflector having a front open end, a flash illumination-producing flash tube inside the flash reflector, and a light-transmitting flash cover-lens over the front open end of the flash reflector. The flash cover-lens has film identifying indicia to identify the filmstrip which are light-transmitting to the same extent as the flash cover-lens in order to transmit flash illumination produced by the flash tube in concert with the flash cover-lens.

SUMMARY OF THE INVENTION

According to one aspect of the invention, a one-time-use camera which comprises a filmstrip, and an electronic flash with a concave-shaped flash reflector having a front open end, a flash illumination-producing flash tube inside the flash reflector, and a light-transmitting flash cover-lens over the front open end of the flash reflector, is characterized in that:

at least one of the flash reflector and the flash cover-lens has film identifying indicia visible from outside the camera to identify the filmstrip and is adhered to the flash tube to prevent the flash reflector and/or flash cover-lens with the film identifying indicia from being separated the said flash tube without breaking the flash tube, whereby removal of the film identifying indicia in effect destroys the electronic flash.

According to another aspect of the invention, a one-time-use camera comprising a filmstrip, a concave-shaped flash reflector having a front open end, a flash illumination-producing flash tube inside the flash reflector, and a light-transmitting flash cover-lens over the front open end of the flash reflector, is characterized in that:

the flash reflector has film identifying indicia to identify the filmstrip which are light-reflecting to the same extent as the flash reflector in order to reflect flash illumination produced by the flash tube in concert with the flash reflector.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Preferred Embodiment (FIGS. 1–5)

Referring now to the drawings, FIGS. 1–5 show a one-time-use camera 10 which includes a plastic opaque main body part 12 and a pair of plastic opaque front and rear cover parts 14 and 16 which house the main body part between them. The front and rear cover parts 14 and 16 are connected to one another and to the main body part 12 via known hook-in-hole connections (not shown) such as disclosed in prior art U.S. Pat. No. 5,815,740 issued Sep. 29, 1998, and prior art U.S. Pat. No. 5,349,510 issued Sep. 20, 1994.

As is known, the main body part 12 has a rearwardly open cartridge receiving chamber 18 for a conventional film cartridge 20 and a rearwardly open film supply chamber 22 for a rotatably supported film supply spool on which is prewound an unexposed film roll (not shown). See FIG. 1. A rearwardly open backframe opening (not shown) is located between the cartridge receiving chamber 18 and the film supply chamber 22 for exposing successive imaging sections (frames) of a filmstrip 24 which constitutes the unexposed film roll.

A film winding thumbwheel (not shown), rotatably supported on the main body part 12, protrudes outwardly from a slot (not shown) in the rear cover part 16 and has a depending coaxial stem in coaxial engagement with an exposed top end of a film spool inside the film cartridge 20. Manual winding rotation of the film winding thumbwheel counter-clockwise in FIG. 1 similarly rotates the film spool inside the film cartridge 20 to wind each exposed imaging section of the filmstrip 24 into the film cartridge.

The rear cover part 16 has a door cover portion 26 over the cartridge receiving chamber 18 and a remaining cover portion 28. A fracture line of weakness 30 which divides the door cover portion 26 and the remaining cover portion 28 permits the door cover portion to be pivoted open relative to the remaining cover portion in order to remove the film cartridge 20 from the cartridge receiving chamber 18. The film cartridge 20 is to be removed from the cartridge receiving chamber 18 when the maximum number of exposures available on the filmstrip 24 have been made and the filmstrip is completely wound into the film cartridge.

A built-in electronic flash 32 comprises a generally flat flash circuit board 34 supported on the main body part 12, a concave-shaped flash reflector 36 located (partly) in a rectangular hole 38 in the flash circuit board, a flash illumination-producing flash tube 40 positioned rearmost within the flash reflector against an inner side 42 of the flash reflector, and a light-transmitting transparent (or alternately translucent) plastic flash cover-lens 44 positioned over a front open end 46 of the flash reflector. See FIG. 2.

The flash tube 40 is filled with an ionizable gas, and it has an in-line pair of anode and cathode main electrodes 48 and 50 at its opposite ends. The anode and cathode electrodes 48 and 50 protrude from respective side openings 52, 52 in the flash reflector 36 and are connected at respective electrically conductive solder deposits 54 to a pair of identical resilient contact beams 56, 56 on the flash circuit board 34 which, in turn are connected to a capacitor 58 on the flash circuit board. See FIGS. 1, 2 and 5. The resistance of the gas in the flash tube 40 is normally too high to permit a direct discharge. For firing the flash tube 40, there is provided a third electrode, i.e. a triggering electrode, for example a triggering wire 60 that is connected rearmost to an outer side 62 of the flash reflector 36 using solder, tape or the like. When the triggering wire 60 applies a triggering voltage to the flash reflector 36, the gas in the flash tube 40 is ionized, thus lowering its resistance and allowing the capacitor 58 to discharge its stored energy through the flash tube in the form of a brilliant flash of light.

The flash reflector 36 is shaped to concentrate the flash illumination produced by the flash tube 40 and to direct the flash illumination to the front open end 46 of the reflector, through the flash cover-lens 44, and towards the subject to be illuminated. A pair of top and bottom resilient prongs 64 and 66 on the flash reflector 36 are received in mating openings 68 and 70 in the flash circuit board 34 and are adhered to the flash circuit board 34 via non-conductive adhesive deposits 72 and 74 at the openings. See FIGS. 2 and 5. The flash reflector 36 is adhered to the flash tube 40 via non-conductive adhesive deposits 76, 76 adjacent the side openings 52, 52 in the flash reflector. See FIG. 5.

The flash cover-lens 44 has two identical resilient side-hooks 78, 78 that are received in mating openings 80, 80 in the flash circuit board 34 and are adhered to the flash circuit board and the flash tube 40 via non-conductive adhesive deposits 82, 82 at the openings. See FIGS. 2 and 5. A top prong 84 of the flash cover-lens 44 is received in a mating opening 86 in the flash circuit board 34 and is adhered to the flash circuit board via a non-conductive adhesive deposit 88 at the opening.

Figure 1:
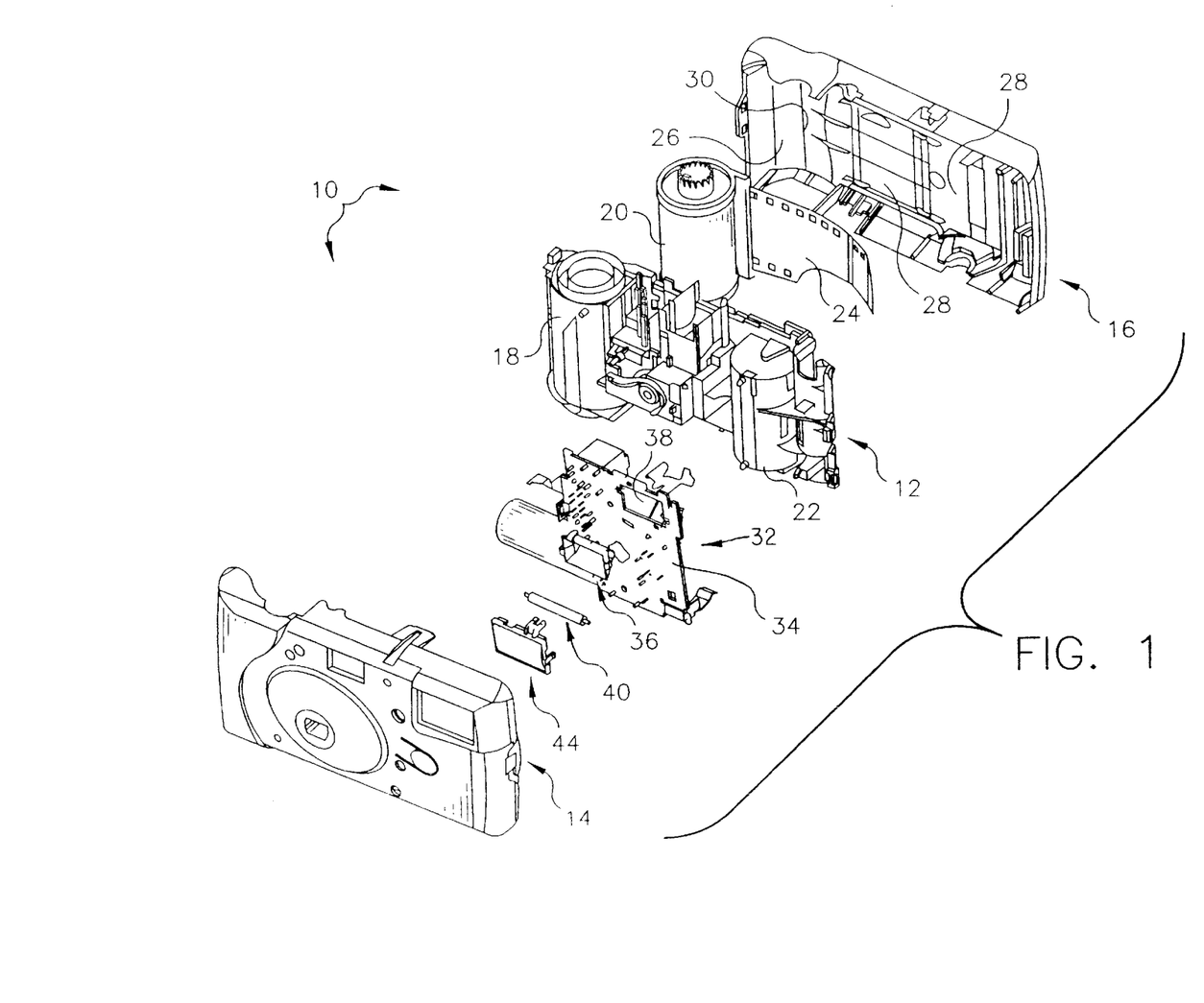
FIG. 1 is an exploded front perspective view of a one-time-use camera with an electronic flash which is a preferred embodiment of the invention.
Figure 2:
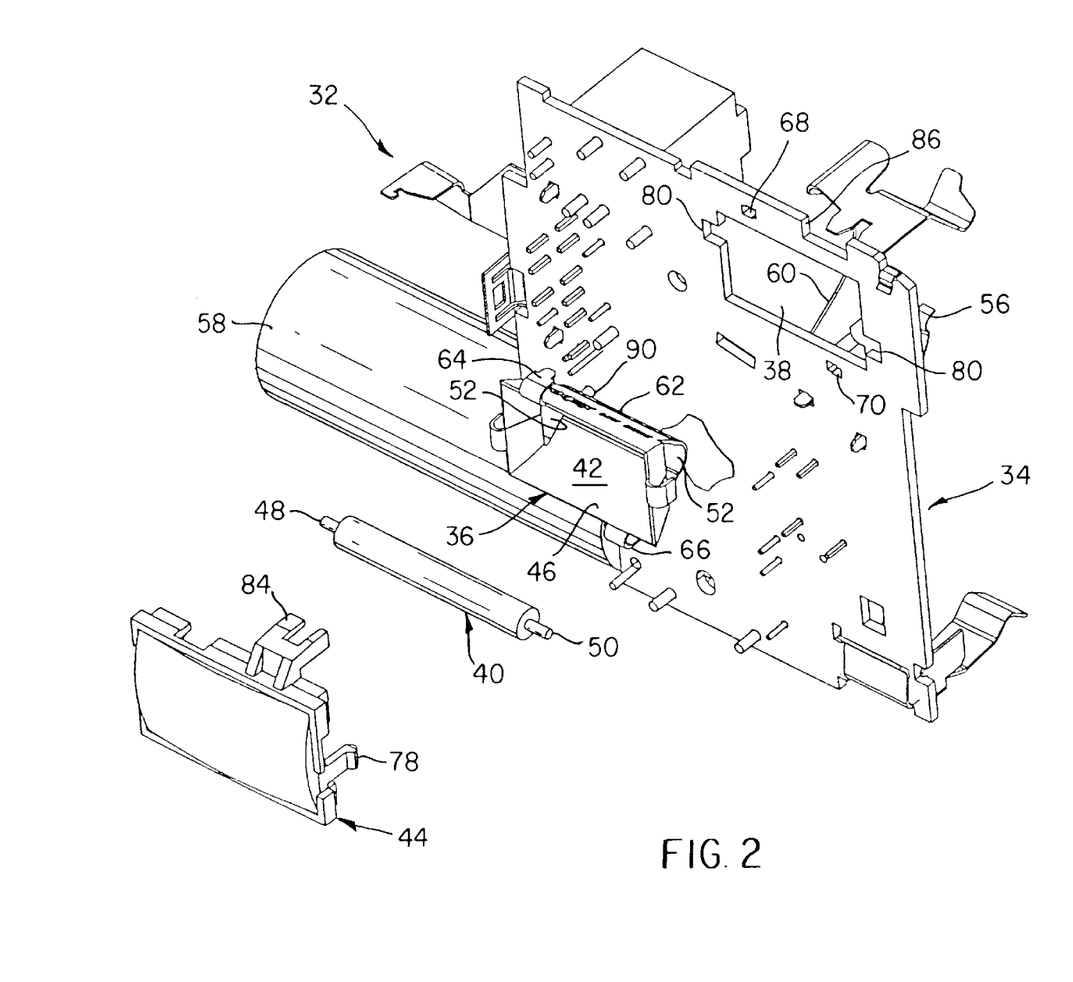
FIG. 2 is an exploded front perspective view of the electronic flash.
Figure 3:
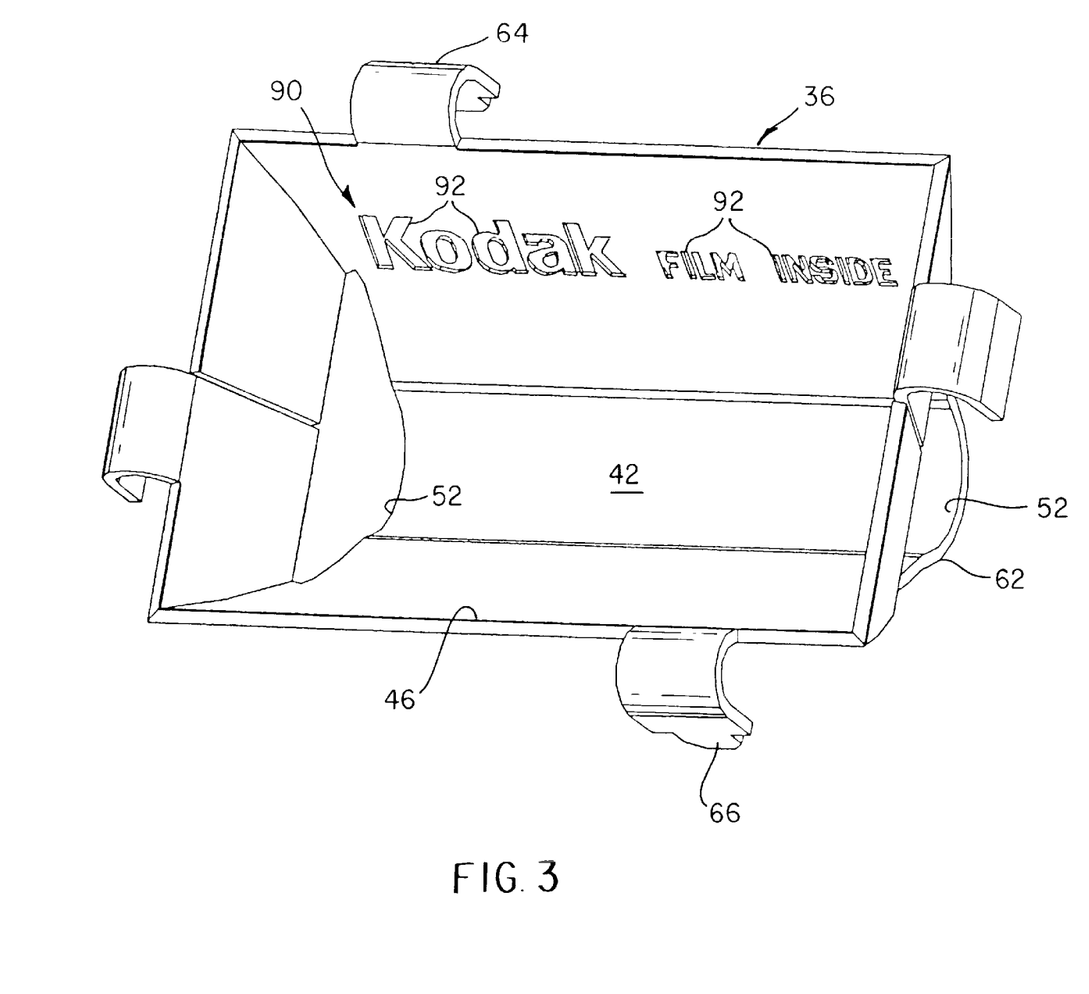
FIG. 3 is a front perspective view of a flash reflector of the electronic flash.
Figure 4:
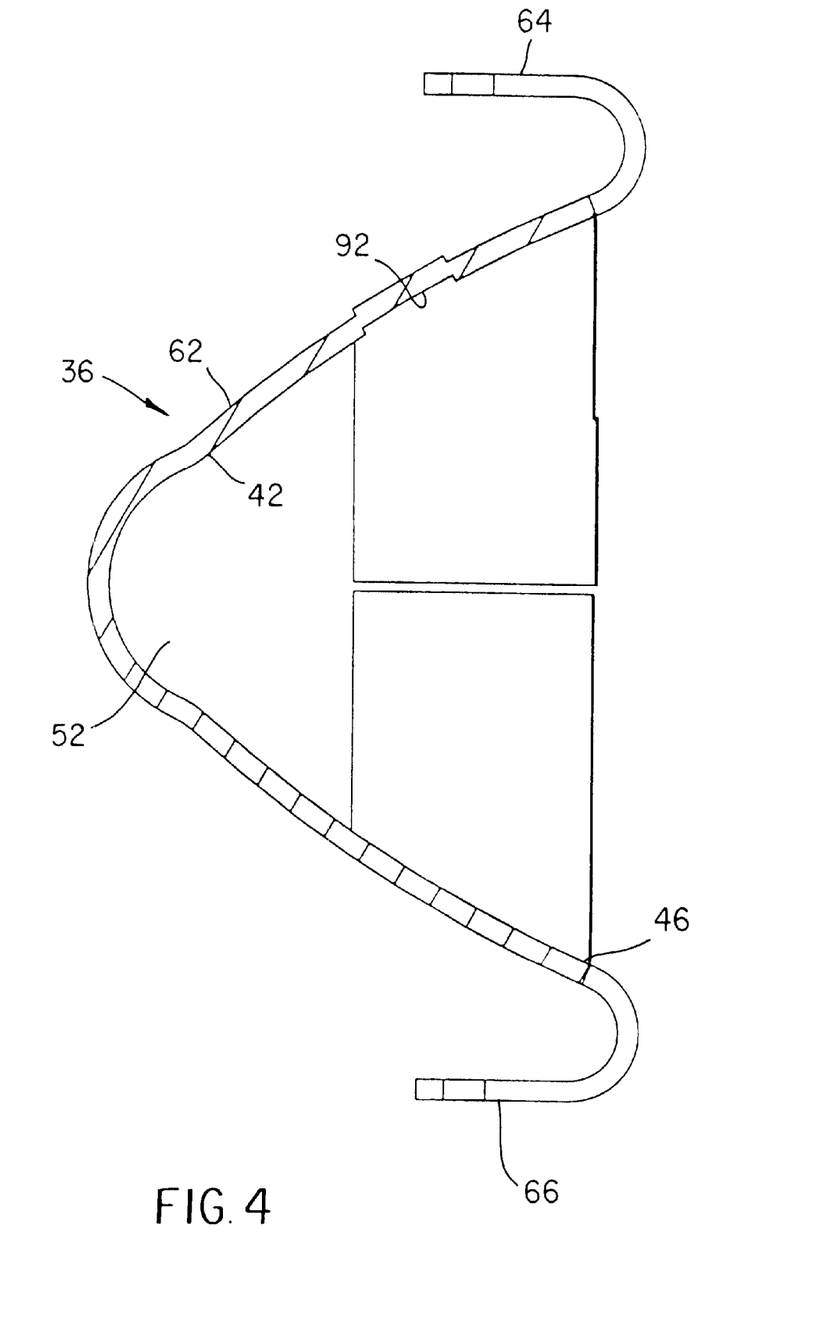
FIG. 4 is a cross-section elevation view of the flash reflector.
Figure 5:
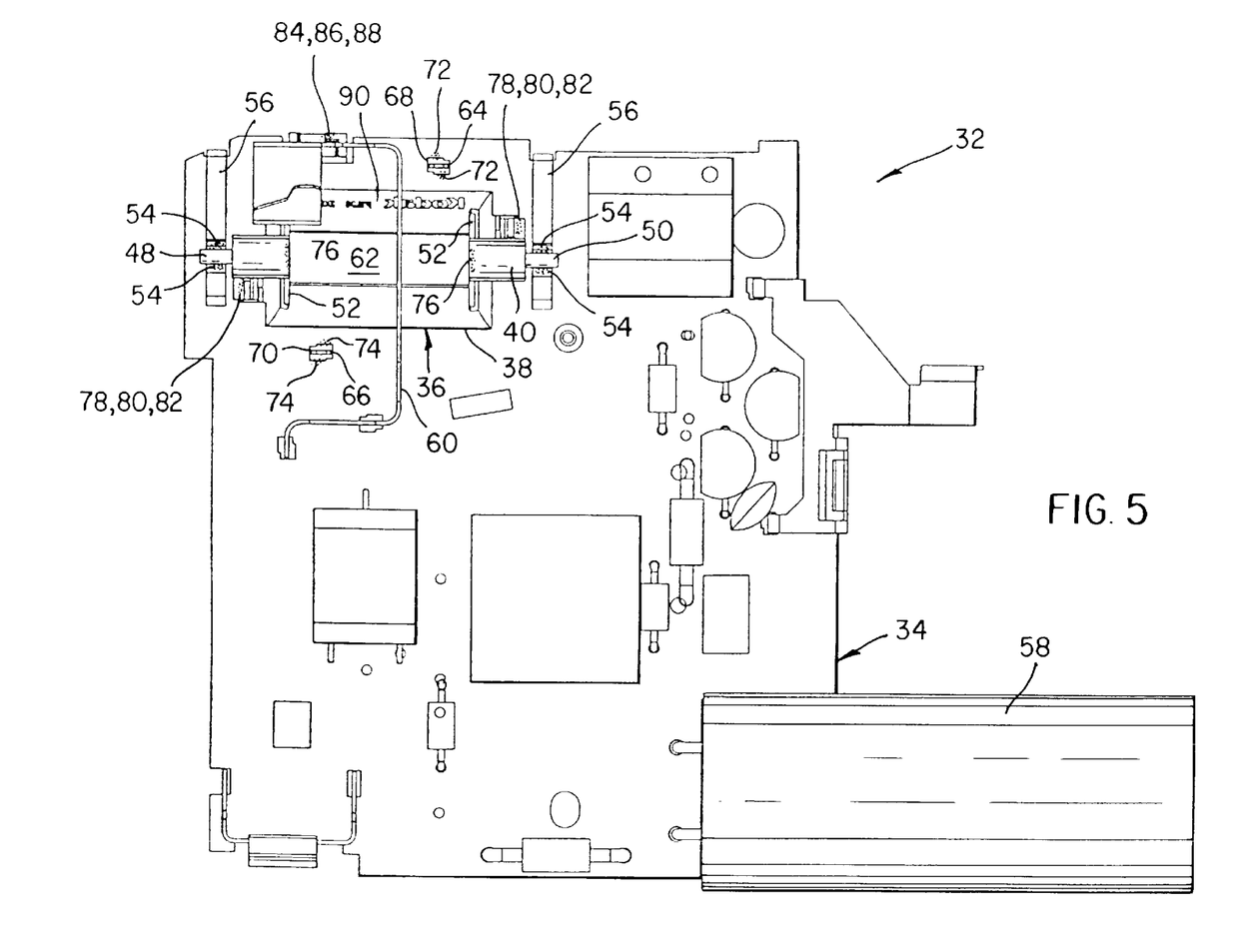
FIG. 5 is a rear elevation view of the electronic flash.

As shown in FIGS. 3 and 4, film identifying indicia 90, such as "Kodak Film Inside", to identify the filmstrip 24 constitute depressed portions 92 of the flash reflector 36 which are depressed beginning at the inner side 42 of the flash reflector 36. The depressed portions 92 project from the outer side 62 of the flash reflector 36 and each one of them is an individual letter of the alphabet that collectively forms the message "Kodak Film Inside". The depressed portions 92 are light-reflecting to the same extent, i.e. have the same reflectivity, as the remainder of the inner side 42 of the flash reflector 36 in order to reflect the flash illumination produced by the flash tube 40 in concert with the flash reflector.

Since the flash reflector 36 is adhered to the flash tube 40 via the adhesive deposits 76, 76 at the side openings 52, 52 in the flash reflector, and the anode and cathode electrodes 48 and 50 of the flash tube are connected via the solder deposits 54 to the contact beams 56, 56 on the flash circuit board 34, any attempt to separate the flash reflector from the flash tube in order to replace the flash reflector with one not having the film identifying indicia 90 will break the flash tube and, thus, in effect destroy the electronic flash 32. See FIG. 5.

Figure 6:
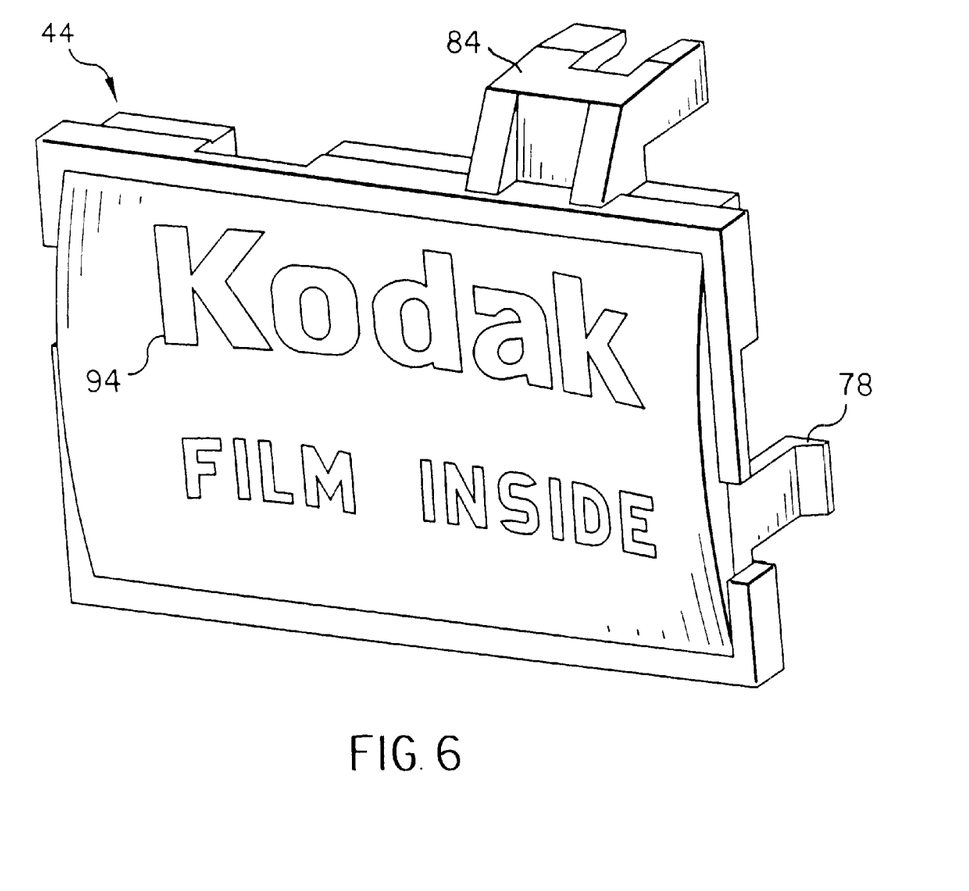
FIG. 6 is a front perspective view of a flash cover-lens of the electronic flash which is an alternate embodiment of the invention.
Figure 7:
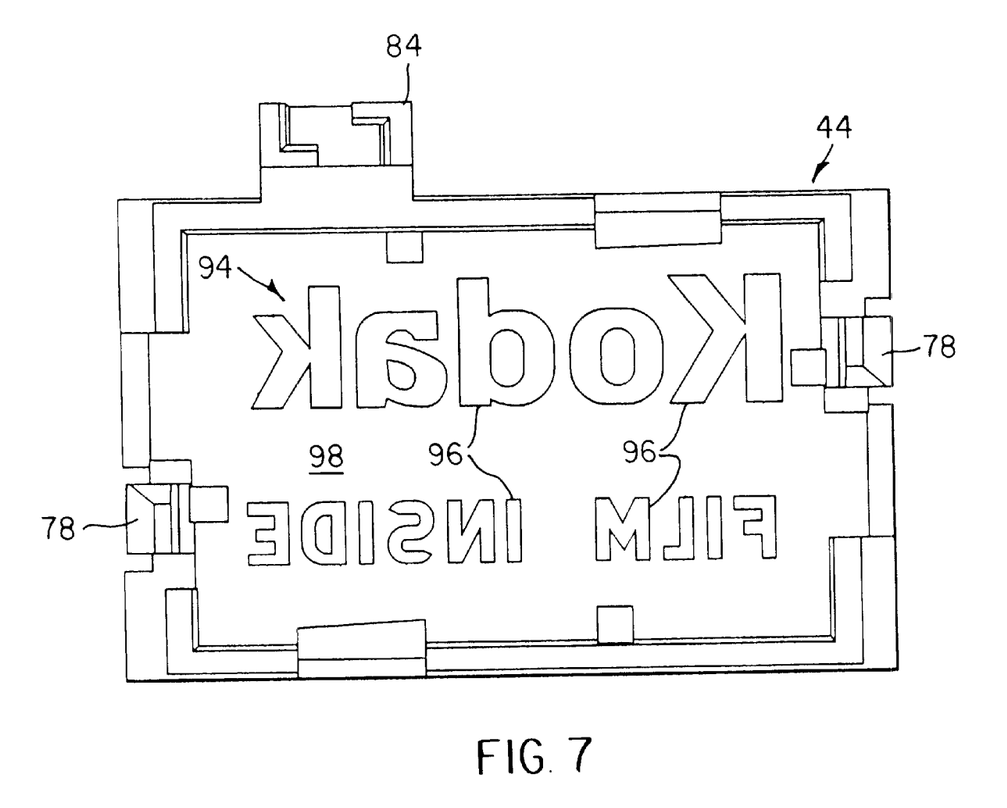
FIG. 7 is a rear elevation view of the flash cover-lens.
Figure 8:
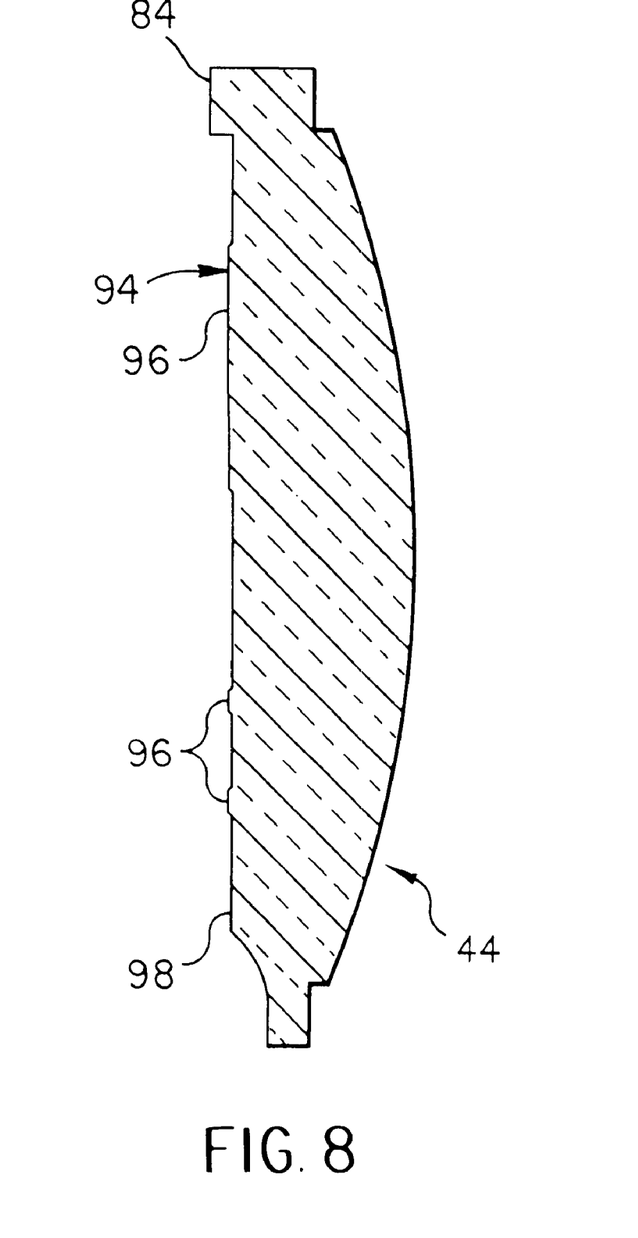
FIG. 8 is a cross-section elevation view of the flash cover lens.

Alternate Embodiment (FIGS. 6–8)

FIGS. 6–8 show an alternate embodiment of the flash cover-lens 44.

Film identifying indicia 94, such as "Kodak Film Inside", to identify the filmstrip 24 constitute integrally-formed raised-portions 96 of the flash cover-lens 44 that project from a flat inside surface 98 of the flash cover-lens. See FIGS. 6–8. Each one of the raised portions 96 is an individual letter of the alphabet that collectively forms the message "Kodak Film Inside". The raised portions 96 are light-transmitting to the same extent, i.e. have the same transparency, as the remainder of the flash cover-lens 44 in order to transmit the flash illumination produced by the flash tube 40 in concert with the flash cover-lens.

Since the flash cover-lens 44 is adhered to the flash tube 40 via the adhesive deposits 82, 82 at the openings 80, 80 in the flash circuit board 34, any attempt to separate the flash cover-lens from the flash tube in order to replace the flash cover-lens with one not having the film identifying indicia 94 will break the flash tube and, thus, in effect destroy the electronic flash 32. See FIG. 5.

The invention has been described with reference to a preferred embodiment. However, it will be appreciated that variations and modifications can be effected by a person of ordinary skill in the art without departing from the scope of the invention. For example, instead of the film identifying indicia 94, being raised-portions 96 of the flash cover-lens 44 that project from the flat inside surface 98 of the flash cover-lens, they can be depressions in the flat inside surface. Similarly, instead of the film identifying indicia 90 being depressed portions 92 of the flash reflector 36 that are depressed beginning at the inner side 42 of the flash reflector, they can be raised from the inner side.

PARTS LIST 10. one-time-use camera
12. main body part
14. front cover part
16. rear cover part
18. cartridge receiving chamber
20. film cartridge
22. film supply chamber
24. filmstrip
26. door cover portion
28. remaining cover portion
30. fracture line of weakness
32. electronic flash
34. flash circuit board
36. flash reflector
38. hole
40. flash tube
42. inner side
44. flash cover-lens
46. front open end
48. anode electrode
50. cathode electrode
52, 52. side openings
54, 54. solder deposits
56, 56. contact beams
58. capacitor
60. triggering wire
62. outer side
64. top prong
66. bottom prong
68. opening
70. opening
72. adhesive deposit
74. adhesive deposits
76, 76. adhesive deposits
78, 78. side-hooks
80, 80. openings
82, 82. adhesive deposits
84. top prong
86. opening
88. adhesive deposit
90. film identifying indicia
92. depressed portions
94. film identifying indicia
96. raised-portions
98. flat inside surface

What is claimed is:

1. A one-time-use camera which comprises a filmstrip, and an electronic flash with a concave-shaped flash reflector having a front open end and an inner side, a flash illumination-producing flash tube inside said flash reflector, and a light-transmitting flash cover-lens over said front open end of the flash reflector, is characterized in that:

said flash reflector has integral depressed portions at least some of which are differently shaped than the others to form a readable message of different spatial forms that constitute film identifying indicia visible from outside said camera through said flash cover-lens to identify said filmstrip, which are depressed beginning at said inner side, and all of which are light-reflecting to the same extent as the remainder of said flash reflector in order to reflect flash illumination produced by said flash tube in concert with the remainder of the flash reflector, and said flash reflector is adhered to said flash tube to prevent said flash reflector from being separated from said flash tube to gain access to said depressed portions at said inner side without breaking said flash tube.

* * * * *